Nov. 22, 1932.  W. A. TRYON  1,888,642
METHOD OF ASSEMBLING YIELDABLE BUSHINGS ON SUPPORTING PINS
Filed June 27, 1929
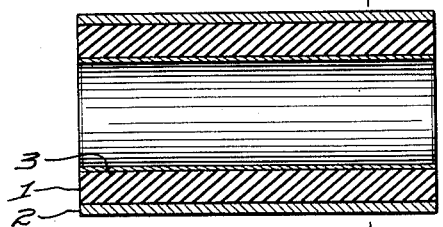
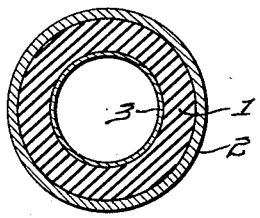
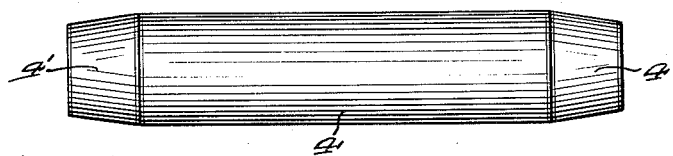
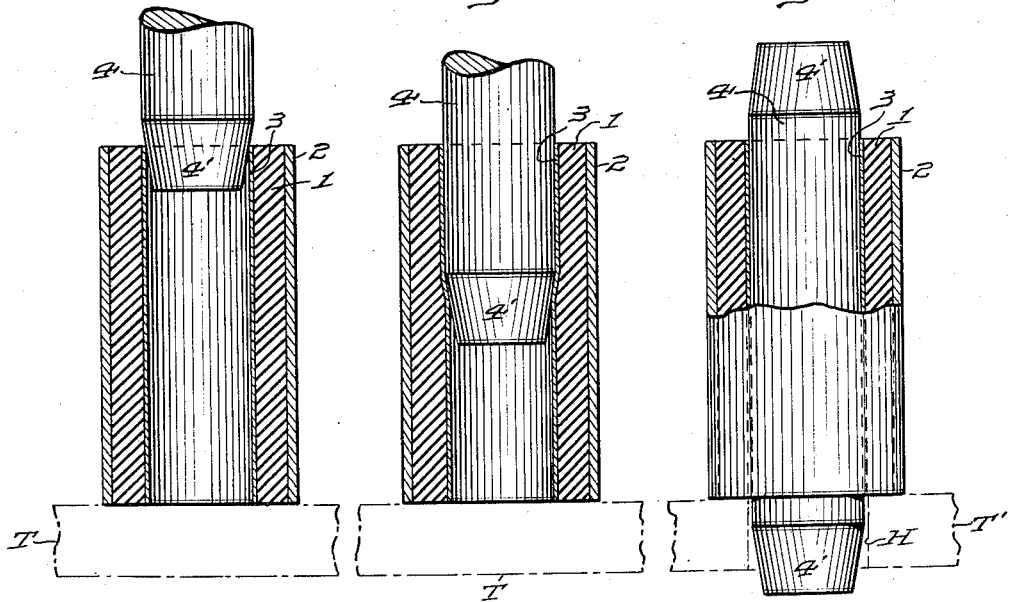
INVENTOR
William A. Tryon.
WITNESS
BY
ATTORNEYS Patented Nov. 22, 1932

1,888,642

UNITED STATES PATENT OFFICE

WILLIAM A. TRYON, OF ELMIRA, NEW YORK

METHOD OF ASSEMBLING YIELDABLE BUSHINGS ON SUPPORTING PINS

Application filed June 27, 1929. Serial No. 374,011.

The present invention is of particular advantage in connection with that class of spring shackles for automobiles and other vehicles in which the flexibility or capacity for relative movement between the parts of the shackle is secured through the employment of a medium, such as rubber or the like, which is capable of yielding or moving upon itself instead of through the provision, as in the forms of shackles at present commonly employed in the automotive industry, of bearing surfaces or anti-friction bearings between those parts of the shackle which are designed to move relatively to each other under operative conditions.

The yielding medium to which I have referred is usually in the form of a cylindrical non-rotatable bushing surrounding a transversely extending pin interposed between the side links of the shackle and prevented from rotative movement therein. This yielding bushing is, in turn, surrounded by a relatively thin sleeve of metal non-rotatable as to the bushing and adapted to be received in the eye of the spring or of the spring hanger of the automobile and prevented from rotation therein; it results, under these conditions, that as the yielding bushing cannot rotate on the pin and as the sleeve enclosing the bushing cannot rotate in its supporting member and as the pins are prevented from rotation in the side links of the shackle, any relative movement of the spring and vehicle frame or other parts between which the shackle is interposed is absorbed in the yielding bushings of the shackle which turn or twist upon themselves as the shackle plays back and forth.

Shackles of this general character are rapidly coming into use in the automotive industry as they present numerous advantages over the forms of shackle heretofore customarily employed, but heretofore considerable difficulty has been encountered in economically and satisfactorily assembling the yielding bushings on the pins in such manner that they are incapable of rotation thereon under normal conditions of operation and which, if it occurs, largely destroys the proper functioning and utility of the shackle.

The present invention, therefore, has for its primary object the provision of a method of assembling the yieldable bushings upon the shackle or other pins in such manner as to prevent any relative rotation between these parts under normal conditions of operation as aforesaid, said method being adapted for rapid and economical performance and thus suited for mass production at a low cost as practised in the automotive industry.

A further object of the invention is to provide a method of the character aforesaid, through the medium of which the resilient bushing can be placed in a high state of radial compression between its supporting pin and its surrounding sleeve, a condition which is extremely desirable for the proper performance of the shackle under operative conditions.

A still further object of the invention is the provision as an article of manufacture adapted for assembly in shackles of the class to which my invention relates, of a unitary combination of elements comprising a pin having disposed thereon a surrounding tube or liner of relatively ductile metal in turn surrounded by a bushing of yieldable material enclosed in a metallic sleeve, the yieldable material being in a state of high radial compression and all of the said parts being incapable of relative axial rotation with respect to each other save through a twisting or yielding movement of the resilient material upon itself.

Other objects, advantages and novel features comprehended by the invention are hereinafter more particularly pointed out or will be apparent to those skilled in the art from the following description of a preferred manner of performing the invention in connection with which reference may be had to the accompanying drawing in which Fig. 1 is a longitudinal central section and Fig. 2 a transverse section of the yieldable bushing and its enclosing sleeves preparatory to assembly on the pin; Fig. 3 is a side elevation of the pin, and Figs. 4, 5 and 6 are views, partly in elevation and partly in central section, of the parts shown in the preceding figures and progressively illustrating the method of their assembly in accordance with the present invention.

In accordance with the invention, a hollow cylindrical bushing 1 of yieldable material such, for example, as rubber, is prepared and disposed within a surrounding sleeve 2 of metal of proper external diameter to tightly engage in the spring eye or other part in which it is to be ultimately seated. This sleeve is of sufficient strength to prevent material radial expansion when the bushing is radially compressed therein as hereinafter described and is usually formed of steel or other relatively strong material. In the interior of the bushing is also fitted, preferably as tightly as possible, a thin tube or liner 3 of relatively soft and ductile material such as copper, the inner diameter of this tube being slightly less than the diameter of the shackle pin 4 designed for its reception. Desirably the yieldable bushing after being molded or otherwise formed, is disposed between the outer sleeve and the tube and the several parts then vulcanized together in coaxial relation, although it may sometimes be preferred to vulcanize the bushing separately, assuming that vulcanization is employed at all, and to then assemble it with the outer sleeve and tube in any convenient way, the parts when so assembled appearing as in Figs. 1 and 2 of the drawing, the former of which is a longitudinal central section through the sleeve, bushing and tube and the latter a transverse section on the line 2—2 of Fig. 1.

The invention particularly lends itself for use in connection with cylindrical shackle pins having tapered ends 4' adapted to seat in the side links of the shackle, and such a pin is shown in Fig. 3 in elevation; however, should pins not embodying tapered ends be used, it is desirable that at least one end of the pin be beveled or chamfered at the corner formed by the intersection of its side wall and end face for a reason which will hereinafter appear.

The yieldable bushing having been assembled between the outer sleeve and the inner tube as heretofore described and a pin of proper diameter and preferably of the character of that shown in Fig. 3 selected, one end of the pin is then entered in an end of the inner tube as shown in Fig. 4, and longitudinally directed pressure applied to the opposite end of the pin. This operation is conveniently effected in a suitable press upon the table T of which, as indicated in dotted lines in Figs. 4 and 5, the lower end of the bushing may be seated. By reason of the tapering formation at the end of the pin the latter is readily entered in the upper end of the inner tube, and as the pin is forced axially therethrough by the application of sufficient pressure to effect this result, the tube is radially expanded as indicated in Fig. 5 so as to correspondingly radially compress the yieldable bushing 1 against the outer sleeve 2 while an extremely intimate engagement is effected between the inner tube 3 and the pin itself which effectively negatives the possibility of any relative rotation between these parts under any normal conditions of operation to which the shackle may be subsequently subjected.

It is usually desirable that during the major portion of the movement of the pin through the sleeve, the lower end of the latter be afforded a firm support upon the table of the press or other apparatus employed so as to prevent any possibility of the tube being forced longitudinally out of the bushing, a result which can be readily accomplished by seating the tube, bushing and outer sleeve upon a solid portion of the table until the lower end of the pin approaches the lower end of the sleeve. When this condition is attained there is no longer any material danger of the tube extruding from the bushing so that the parts can then be transferred to a portion T' of the table provided with a hole H of sufficient diameter to receive the lower end of the pin as indicated in Fig. 6 so that the pin can then be forced entirely through the tube to project the proper distance therebeyond to dispose the bushing midway between the upper and lower ends of the pin.

It will be apparent that at the conclusion of the operation described, the yieldable bushing is seated upon the pin in a state of relatively high radial compression with the now expanded tube interposed between its inner wall and the body of the pin and in intimate engagement with both, whereby through such intimate engagement, relative rotation of the tube on the pin or of the bushing on the tube is negatived under any ordinary condition of operations to which the parts may be subjected when thereafter assembled in the shackle, while, equally, the high state of radial compression of the yieldable bushing effects a corresponding intimate engagement between its outer surface and the inner wall of the surrounding sleeve with consequent negation of relative rotation or slipping between these parts under like conditions.

I have thus provided an article of manufacture comprising the pin, tube, yieldable bushing and surrounding sleeve eminently adapted for its intended function when operatively assembled in the complete shackle and which, so far as I am aware, is much more satisfactory than the units heretofore devised for a like purpose and in which it has been customary to position the yieldable bushing directly on the pin without the interposition of a metallic tube or other equivalent means. Under these conditions much difficulty has been encountered in insuring the desired non-rotatable engagement of the bushing with the pin and also of the outer sleeve with the surface of the bushing, for the reason among others, that when an attempt is made to force the pin longitudinally through the bushing without the interposition of the tube or liner of metal, the material of which the bushing is made tends to flow and heap up before the end of the pin when the latter is of sufficient diameter to insure the proper adhesion of the bushing to the pin after the parts are assembled. By the provision of the expansible tube or liner, however, I am enabled to seat a pin of the requisite diameter in the bushing by forcing it longitudinally therethrough without any material disturbance of the bushing material other than its desirable radial compression which insures the proper ultimate adhesion of the parts and consequent negation of relative rotation between them. The tapered conformation of the entering end of the pin facilitates its progress through the tube and requisite expansion thereof; consequently, if it be desired to employ a pin devoid of the tapered end it is desirable that the corner between the cylindrical surface of the pin and its end face be chamfered or rounded as above mentioned prior to the assembly operation. If desired, a suitable lubricant can be utilized to facilitate the passage of the pin through the tube but under most conditions and with a tube of copper or other like ductile material this will be found unnecessary and I prefer to dispense with the use of the lubricant wherever possible.

While I have employed herein certain terms, such as upper, lower or the like, to denote relative position, no restriction or limitation is to be understood as imported thereby, said terms being utilized solely for convenience of description.

While I have herein referred in considerable detail to one manner of performing the invention, I do not intend to thereby confine or restrict myself thereto as changes and modifications may be made in the practice of the invention if desired without departing from the spirit and scope thereof as defined in the appended claims.

Having thus described my invention, I claim and desire to protect by Letters Patent of the United States:

1. The method of assembling a hollow bushing of yieldable material in non-rotatable position on a pin, which comprises the steps of enclosing the bushing in a substantially non-radially expansible sleeve disposing in the bushing a relatively thin tube of expansible material and then forcing the pin longitudinally through the tube to thereby expand the latter radially throughout its length.

2. The method of assembling a hollow bushing of yieldable material in non-rotatable position on a pin, which comprises the steps of disposing the bushing between a relatively non-radially expansible sleeve and a relatively thin hollow expansible element of less initial diameter than the pin and then forcing the pin longitudinally through the element to thereby expand both the element and the bushing on the pin.

3. The method of assembling a bushing of yieldable material on a pin, which comprises the steps of disposing the bushing within a substantially non-radially expansible sleeve and disposing within the bushing a hollow tube of readily expansible metal and then forcing the pin longitudinally through the tube by axially directed pressure to thereby effect radial expansion of the tube and the bushing and intimate engagement of the former with the pin.

4. The method of assembling a bushing of yieldable material on a pin, which comprises the steps of disposing the bushing between a substantially non-radially expansible sleeve and a hollow tube of readily expansible metal having a relatively thin wall and of less internal diameter than the external diameter of the pin, and then forcing the pin longitudinally through the tube by axially directed pressure to thereby effect radial expansion of the tube and the bushing and intimate engagement of the former with the pin throughout their respective lengths.

5. The method of assembling a cylindrical bushing of yieldable material on a cylindrical pin with the bushing in a state of radial expansion, which comprises the steps of enclosing the bushing in a substantially non-radially expansible sleeve, disposing within the bushing a tube of relatively expansible metal and of an internal diameter less than the external diameter of the pin, and then forcing the pin longitudinally through the tube radially throughout its length to thereby expand the tube and correspondingly expand the entire bushing against the sleeve.

6. The method of assembling upon a pin a hollow bushing of yieldable material which comprises the steps of disposing the bushing between an outer sleeve and a hollow inner sleeve, the space bounded by the inner sleeve being of less cross sectional area than the pin, and then forcing the pin longitudinally through the inner sleeve.

In witness whereof, I have hereunto set my hand this 24th day of June, 1929.

WILLIAM A. TRYON.